(12) United States Patent
Min et al.

(10) Patent No.: US 12,304,528 B2
(45) Date of Patent: May 20, 2025

(54) AUTONOMOUS DRIVING METHOD FOR AVOIDING STOPPED VEHICLE AND APPARATUS FOR THE SAME

(71) Applicant: ELECTRONICS AND TELECOMMUNICATIONS RESEARCH INSTITUTE, Daejeon (KR)

(72) Inventors: Kyoung-Wook Min, Sejong-si (KR); Jae-Hyuck Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 391 days.

(21) Appl. No.: 17/857,352

(22) Filed: Jul. 5, 2022

(65) Prior Publication Data

US 2023/0008458 A1 Jan. 12, 2023

(30) Foreign Application Priority Data

Jul. 9, 2021 (KR) ........................ 10-2021-0090173
May 12, 2022 (KR) ........................ 10-2022-0058339

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 30/18163; B60W 40/04;
(Continued)

(56) References Cited

U.S. PATENT DOCUMENTS 9,164,511 B1 * 10/2015 Ferguson ............. G05D 1/0088
10,156,851 B1 12/2018 Silver et al.
(Continued)

FOREIGN PATENT DOCUMENTS

JP 2005-107917 A 4/2005
JP 2021-104770 A 7/2021
(Continued)

*Primary Examiner* — Peter D Nolan
*Assistant Examiner* — Demetra R Smith-Stewart
(74) *Attorney, Agent, or Firm* — LRK PATENT LAW FIRM

(57) ABSTRACT

Disclosed herein are an autonomous driving method for avoiding a stopped vehicle and an apparatus for the same. The autonomous driving method for avoiding a stopped vehicle is performed by an autonomous driving control apparatus provided in an autonomous vehicle, and includes obtaining taillight recognition information for a stopped vehicle identified ahead of the autonomous vehicle, determining whether the stopped vehicle is to be avoided in consideration of the taillight recognition information, when it is determined that the stopped vehicle is to be avoided, setting an avoidance method in consideration of whether lane returning is to be performed, which is determined based on an autonomous driving task, and setting an avoidance time point corresponding to the avoidance method and controlling the autonomous vehicle to avoid the stopped vehicle by traveling along an avoidance path generated in conformity with the avoidance time point.

12 Claims, 14 Drawing Sheets

(51) Int. Cl.
*B60W 30/095* (2012.01)
*B60W 30/18* (2012.01)
*B60W 40/04* (2006.01)
*G06V 20/58* (2022.01)

(52) U.S. Cl.
CPC ...... *B60W 30/18163* (2013.01); *B60W 40/04* (2013.01); *B60W 60/0015* (2020.02); *G06V 20/584* (2022.01); *B60W 2420/403* (2013.01); *B60W 2554/20* (2020.02); *B60W 2556/40* (2020.02)

(58) Field of Classification Search
CPC ....... B60W 60/0015; B60W 2420/403; B60W 2554/20; B60W 2556/40; B60W 2520/10; B60W 30/18154; B60W 2552/10; B60W 2554/4042; B60W 2554/802; B60W 2556/50; B60W 60/001; G06V 20/584
See application file for complete search history.

(56) References Cited

U.S. PATENT DOCUMENTS

| | | | |
|---|---|---|---|
| 11,537,127 B2* | 12/2022 | Wilkinson | G05D 1/0221 |
| 2015/0187216 A1 | 7/2015 | Kwak | |
| 2017/0320500 A1* | 11/2017 | Yoo | B60W 30/0956 |
| 2018/0101172 A1 | 4/2018 | Min et al. | |
| 2019/0213103 A1* | 7/2019 | Morley | G06F 11/3692 |
| 2020/0117196 A1* | 4/2020 | Ferguson | G06V 20/584 |
| 2020/0391731 A1 | 12/2020 | Cheon | |
| 2022/0266855 A1* | 8/2022 | He | B60W 60/001 |
| 2022/0301320 A1* | 9/2022 | Hashimoto | G06V 20/584 |
| 2022/0348277 A1* | 11/2022 | Harmon | B62D 21/11 |

FOREIGN PATENT DOCUMENTS

| | | |
|---|---|---|
| KR | 10-2018-0051300 A | 5/2018 |
| KR | 10-2018-0086632 A | 8/2018 |
| KR | 10-2020-0142155 A | 12/2020 |
| KR | 10-2021-0011258 A | 2/2021 |

\* cited by examiner

AUTONOMOUS DRIVING METHOD FOR AVOIDING STOPPED VEHICLE AND APPARATUS FOR THE SAME

CROSS REFERENCE TO RELATED APPLICATIONS

This application claims the benefit of Korean Patent Application Nos. 10-2021-0090173, filed Jul. 9, 2021, and 10-2022-0058339, filed May 12, 2022, which are hereby incorporated by reference in their entireties into this application.

BACKGROUND OF THE INVENTION

1. Technical Field

The present invention relates generally to autonomous driving technology for avoiding a stopped vehicle, and more particularly to technology for allowing an autonomous vehicle to recognize and avoid a stopped vehicle present in a driving lane.

2. Description of Related Art

In most businesses or institutions, a lidar sensor, a camera sensor, a radar sensor, or the like is utilized to support autonomous driving by autonomous vehicles. Generally, when autonomous driving is performed in an urban environment, lane keeping, lane changing, traffic signal recognition, maintenance of appropriate distance between vehicles, emergency stop, etc. are the most essentially required functions, and an avoidance function is additionally required. For example, whether an autonomous vehicle needs to avoid a vehicle located ahead of the autonomous vehicle in the lane in which the autonomous vehicle is traveling may be determined, and an avoidance path therefor needs to be generated and provided so as to enable autonomous driving to a destination.

Unless an avoidance function is provided, a problem may arise in which an autonomous vehicle remains stopped behind a stopped vehicle due to a function of maintaining an appropriate distance from a preceding vehicle, or a complicated situation may occur in which a driver manually avoids the stopped vehicle by changing the driving mode from an autonomous driving mode to a manual driving mode, and thereafter reactivates the autonomous driving function for autonomous driving of the vehicle.

PRIOR ART DOCUMENTS

Patent Documents (Patent Document 1) Korean Patent Application Publication No. 10-2021-0011258, Date of Publication: Feb. 1, 2021 (Title: Method and Apparatus for Determining Driving Priority of Self-Driving Vehicles)

SUMMARY OF THE INVENTION

Accordingly, the present invention has been made keeping in mind the above problems occurring in the prior art, and an object of the present invention is to provide a method for performing autonomous driving to a destination, without changing the driving mode from an autonomous driving mode to a manual driving mode, by generating and providing a path for avoiding a stopped vehicle present in the driving lane of an autonomous vehicle.

Another object of the present invention is to provide an autonomous driving method that improves the accuracy of determination for avoidance by recognizing the taillights of a stopped vehicle and performs an avoidance task.

In accordance with an aspect of the present invention to accomplish the above objects, there is provided an autonomous driving method for avoiding a stopped vehicle, the autonomous driving method being performed by an autonomous driving control apparatus provided in an autonomous vehicle, the autonomous driving method including obtaining taillight recognition information for a stopped vehicle identified ahead of the autonomous vehicle; determining whether the stopped vehicle is to be avoided in consideration of the taillight recognition information; when it is determined that the stopped vehicle is to be avoided, setting an avoidance method in consideration of whether lane returning is to be performed, which is determined based on an autonomous driving task; and setting an avoidance time point corresponding to the avoidance method and controlling the autonomous vehicle to avoid the stopped vehicle by traveling along an avoidance path generated in conformity with the avoidance time point.

The avoidance method may be any one of a first avoidance method for returning to an original lane after avoiding the stopped vehicle and a second avoidance method for performing lane changing while avoiding the stopped vehicle.

The first avoidance method may avoid the stopped vehicle by generating an avoidance local path at an avoidance time point that is set in consideration of a time to brake to avoid a collision with the stopped vehicle, and the second avoidance method may avoid the stopped vehicle by generating a lane-change local path at a time point for lane changing.

Each of the avoidance local path and the lane-change local path may be generated in consideration of an available avoidance space and an avoidance direction that are measured using a high-precision lane level map or a drivable space.

The autonomous driving method may further include, when the avoidance method is set to the first avoidance method, deploying a virtual autonomous vehicle having a size identical to a size of the autonomous vehicle in the avoidance available space, generating a virtual lane central line based on a central line of the virtual autonomous vehicle, and generating the avoidance local path for moving from a lane central line corresponding to the original lane to the virtual lane central line.

The autonomous driving method may further include, when the avoidance method is set to the second avoidance method, generating the lane-change local path for moving from a lane central line corresponding to the original lane to a lane central line corresponding to a target lane in which to travel.

The autonomous driving method may further include, when the avoidance method is set to the first avoidance method, generating a return local path for moving from the virtual lane central line to a lane central line corresponding to the original lane after avoidance of the stopped vehicle has been completed, and performing returning along the return local path.

The autonomous driving method may further include calculating a risk of a collision with an additional vehicle traveling in a lane in the avoidance direction, and performing avoidance when the collision risk is less than or equal to a preset reference risk.

The taillight recognition information may include emergency-light flashing information, taillight on/off information, turn-signal flashing information, and brake-light on/off information.

The stopped vehicle may be identified based on obstacle information that is detected based on at least one of a camera sensor, a lidar sensor or a radar sensor, or a combination thereof.

The autonomous driving method may further include extracting a partial image corresponding to a taillight portion of the stopped vehicle by projecting the obstacle information onto an image; and generating the taillight recognition information based on successive data of an image scene corresponding to the partial image.

In accordance with another aspect of the present invention to accomplish the above objects, there is provided an autonomous driving control apparatus, including a processor configured to obtain taillight recognition information for a stopped vehicle identified ahead of an autonomous vehicle, determine whether the stopped vehicle is to be avoided in consideration of the taillight recognition information, when it is determined that the stopped vehicle is to be avoided, set an avoidance method in consideration of whether lane returning is to be performed, which is determined based on an autonomous driving task, set an avoidance time point corresponding to the avoidance method, and control the autonomous vehicle to avoid the stopped vehicle by traveling along an avoidance path generated in conformity with the avoidance time point; and memory configured to store the taillight recognition information, the avoidance time point, and the avoidance path.

The avoidance method may be any one of a first avoidance method for returning to an original lane after avoiding the stopped vehicle and a second avoidance method for performing lane changing while avoiding the stopped vehicle.

The first avoidance method may avoid the stopped vehicle by generating an avoidance local path at an avoidance time point that is set in consideration of a time to brake to avoid a collision with the stopped vehicle, and the second avoidance method may avoid the stopped vehicle by generating a lane-change local path at a time point for lane changing.

Each of the avoidance local path and the lane-change local path may be generated in consideration of an available avoidance space and an avoidance direction that are measured using a high-precision lane level map or a drivable space.

The processor may be configured to, when the avoidance method is set to the first avoidance method, deploy a virtual autonomous vehicle having a size identical to a size of the autonomous vehicle in the avoidance available space, generate a virtual lane central line based on a central line of the virtual autonomous vehicle, and generate the avoidance local path for moving from a lane central line corresponding to the original lane to the virtual lane central line.

The processor may be configured to, when the avoidance method is set to the second avoidance method, generate the lane-change local path for moving from a lane central line corresponding to the original lane to a lane central line corresponding to a target lane in which to travel.

The processor may be configured to, when the avoidance method is set to the first avoidance method, generate a return local path for moving from the virtual lane central line to a lane central line corresponding to the original lane after avoidance of the stopped vehicle has been completed, and control the autonomous vehicle to perform returning along the return local path.

The processor may be configured to calculate a risk of a collision with an additional vehicle traveling in a lane in the avoidance direction, and perform avoidance when the collision risk is less than or equal to a preset reference risk.

The taillight recognition information may include emergency-light flashing information, taillight on/off information, turn-signal flashing information, and brake-light on/off information.

The stopped vehicle may be identified based on obstacle information that is detected based on at least one of a camera sensor, a lidar sensor or a radar sensor, or a combination thereof.

The processor may be configured to extract a partial image corresponding to a taillight portion of the stopped vehicle by projecting the obstacle information onto an image, and generate the taillight recognition information based on successive data of an image scene corresponding to the partial image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
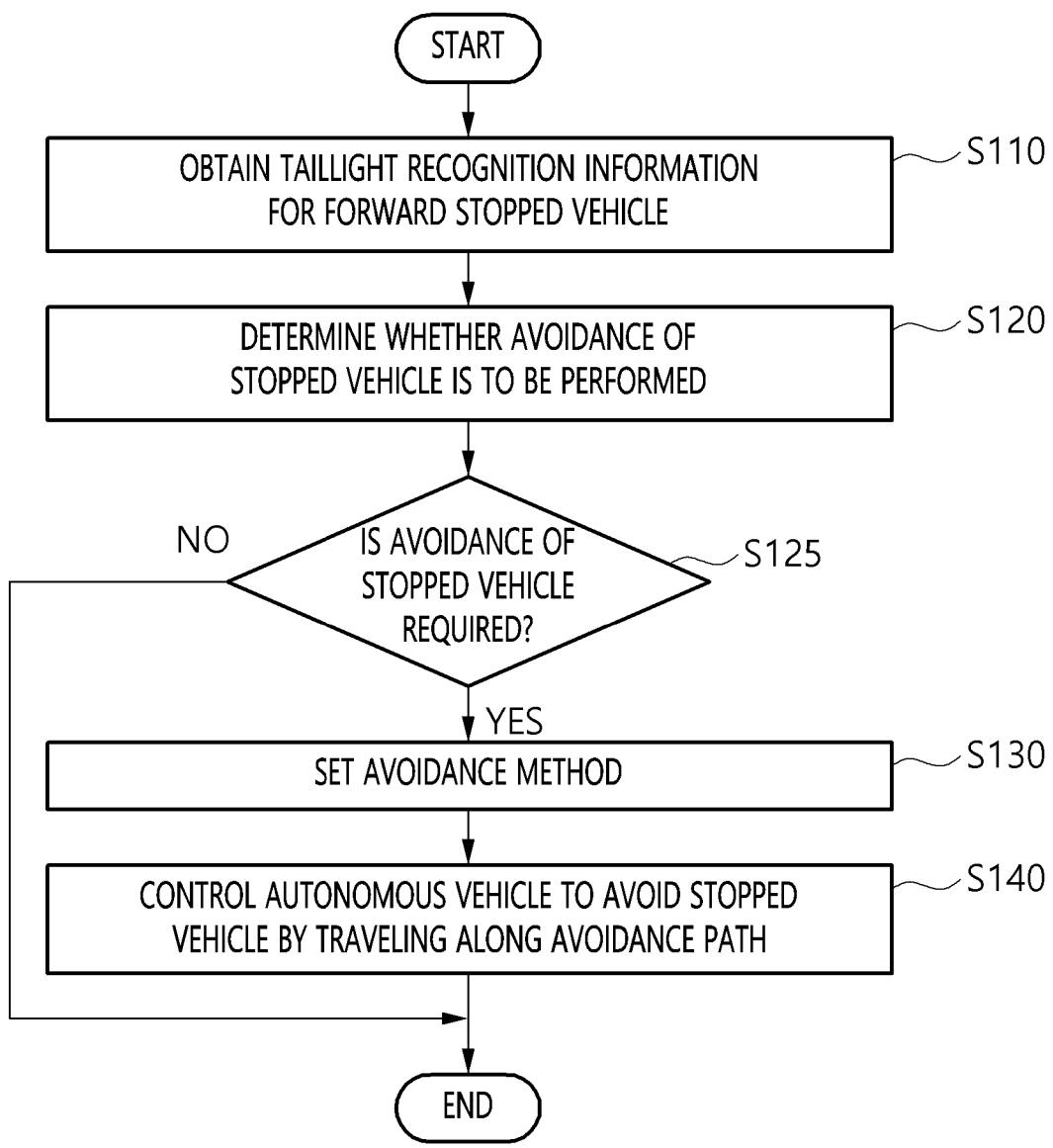
FIG. 1 is an operation flowchart illustrating an autonomous driving method for avoiding a stopped vehicle according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, embodiments of the present invention will be described in detail with reference to the attached drawings.

FIG. 1 is an operation flowchart illustrating an autonomous driving method for avoiding a stopped vehicle according to an embodiment of the present invention.

Referring to FIG. 1, in the autonomous driving method for avoiding a stopped vehicle according to an embodiment of the present invention, an autonomous driving control apparatus provided in an autonomous vehicle obtains recognition information for taillights of a stopped vehicle identified ahead of the autonomous vehicle at step S110.

Here, the stopped vehicle may be identified based on obstacle information that is detected based on at least one of a camera sensor, a lidar sensor or a radar sensor, or combination thereof.

Here, a partial image corresponding to the taillight portion of the stopped vehicle may be extracted by projecting the obstacle information onto an image, and taillight recognition information may be generated based on successive data of image scenes corresponding to the partial image.

For example, an obstacle detected using a camera sensor, a lidar sensor or a radar sensor provided on the autonomous vehicle may be projected onto the image. A partial image may be extracted by cutting only the taillight portion of the stopped vehicle, which is detected in the corresponding image. Thereafter, taillight recognition information indicating the state of the taillights of the stopped vehicle may be obtained through inference of machine learning by inputting the successive data of the image scenes corresponding to the partial image to a machine-learning-based detection module.

Here, the taillight recognition information may include emergency-light flashing information, taillight on/off information, turn-signal flashing information, and brake light on/off information.

For example, the state of taillights depending on the taillight recognition information may be obtained to correspond to {taillight ON/OFF, emergency-light flashing, left/right-turn-signal flashing, and brake light ON/OFF}.

Further, in the autonomous driving method for avoiding a stopped vehicle according to the embodiment of the present invention, the autonomous driving control apparatus provided in the autonomous vehicle determines whether avoidance of the stopped vehicle is to be performed in consideration of the taillight recognition information at step S120.

Figure 3:
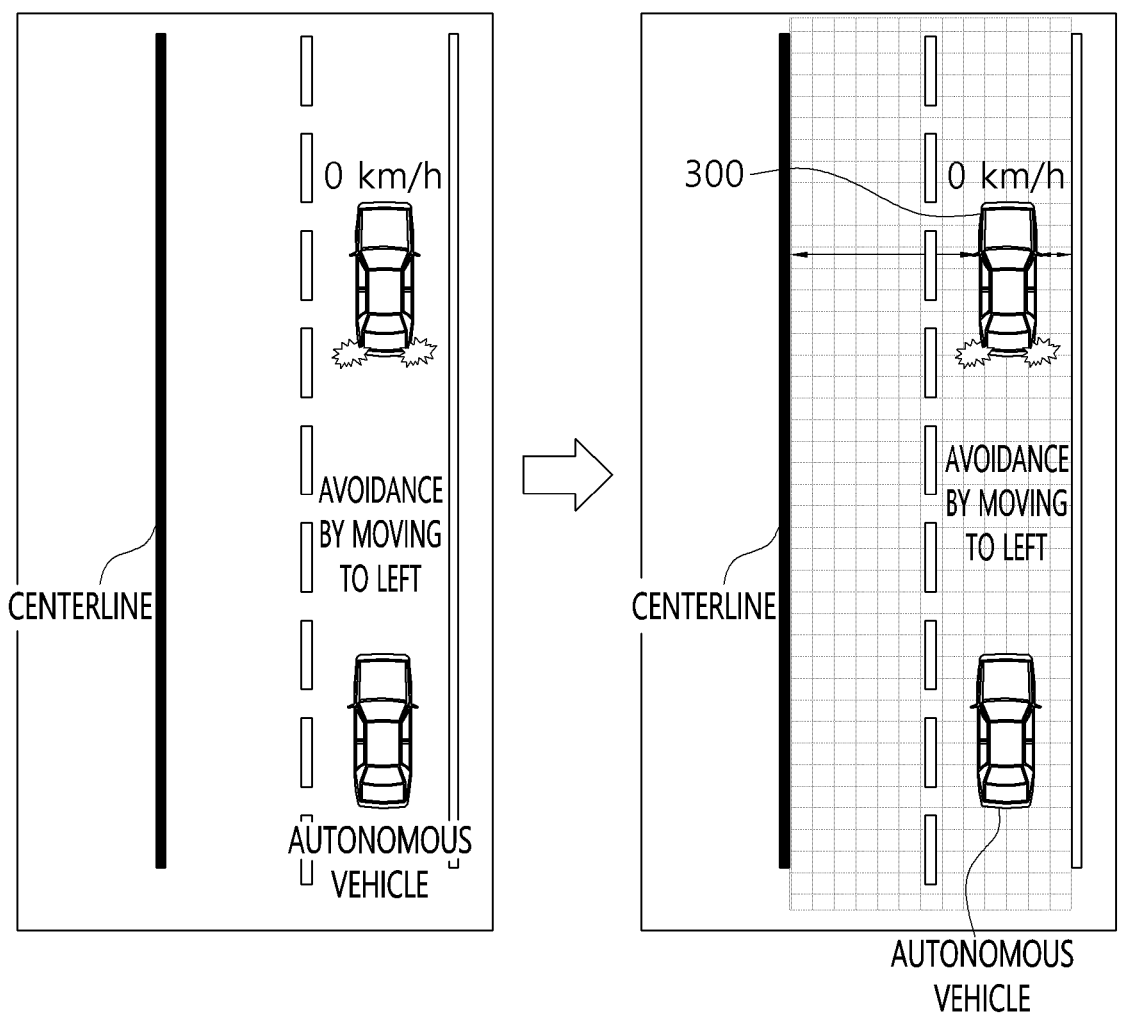
FIGS. 3 to 6 are diagrams illustrating examples of determination of an avoidance available space and an avoidance direction according to the present invention.

In an example, as in CASE #1 illustrated in FIG. 3, it may be assumed that a stopped vehicle 300 is located in the curb lane of a one-way two or more-lane road and that the taillight recognition information for the stopped vehicle 300 corresponds to {taillight Off}, {emergency-light flashing} or {right-turn-signal flashing}. In this case, the autonomous driving control apparatus may determine that the stopped vehicle 300 is attempting to park or temporarily stopped, and may control the autonomous vehicle to avoid the stopped vehicle 300 by moving to the left of the stopped vehicle 300 so that the autonomous vehicle does not continue to wait behind the stopped vehicle 300.

Figure 4:
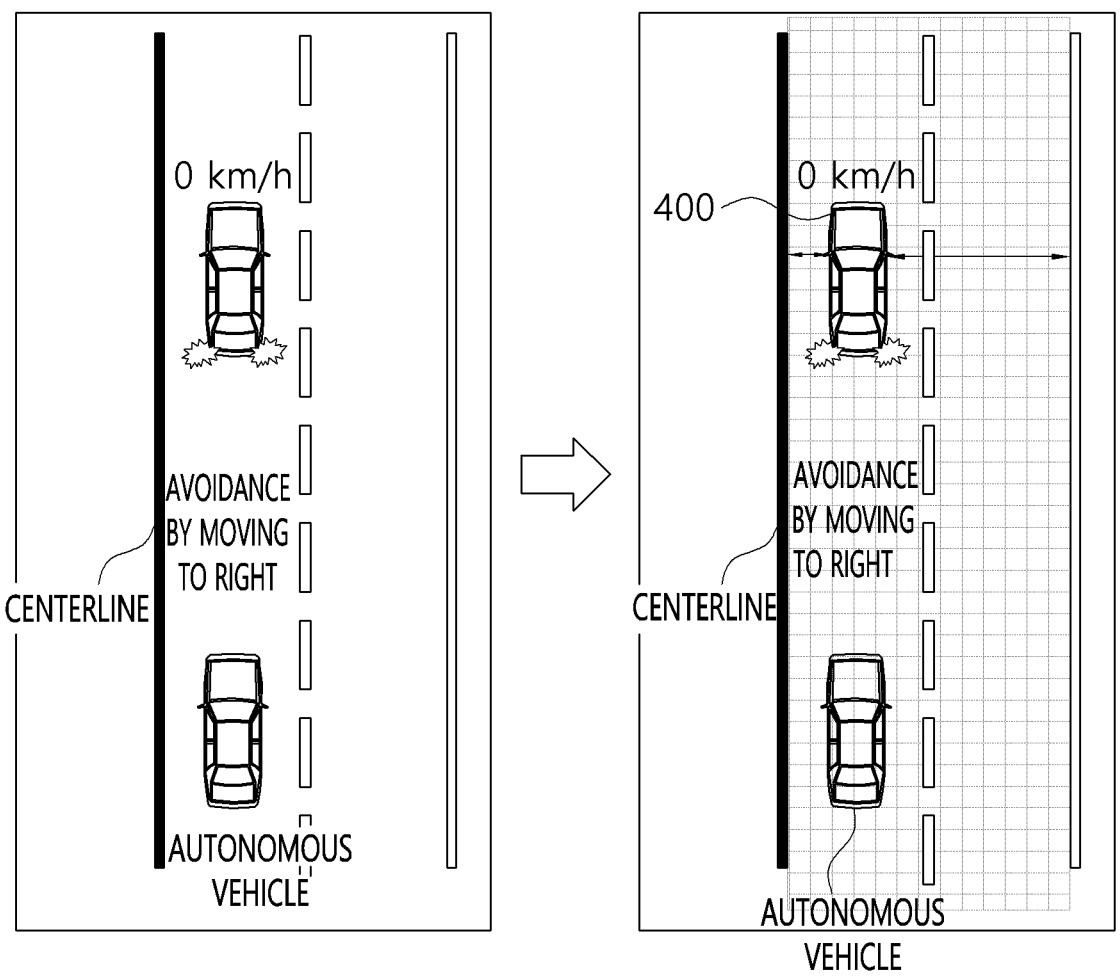

In another example, as in CASE #2 illustrated in FIG. 4, it may be assumed that a stopped vehicle 400 is located in the first lane (or passing lane) of a one-way two or more-lane road and the taillight recognition information for the stopped vehicle 400 corresponds to {taillight OFF} or {emergency-light flashing}. Even in this case, the autonomous driving control apparatus may determine that the stopped vehicle 400 is in a temporary stop situation, and may control the autonomous vehicle to avoid the stopped vehicle 400 by moving to the right of the stopped vehicle 400.

Figure 5:
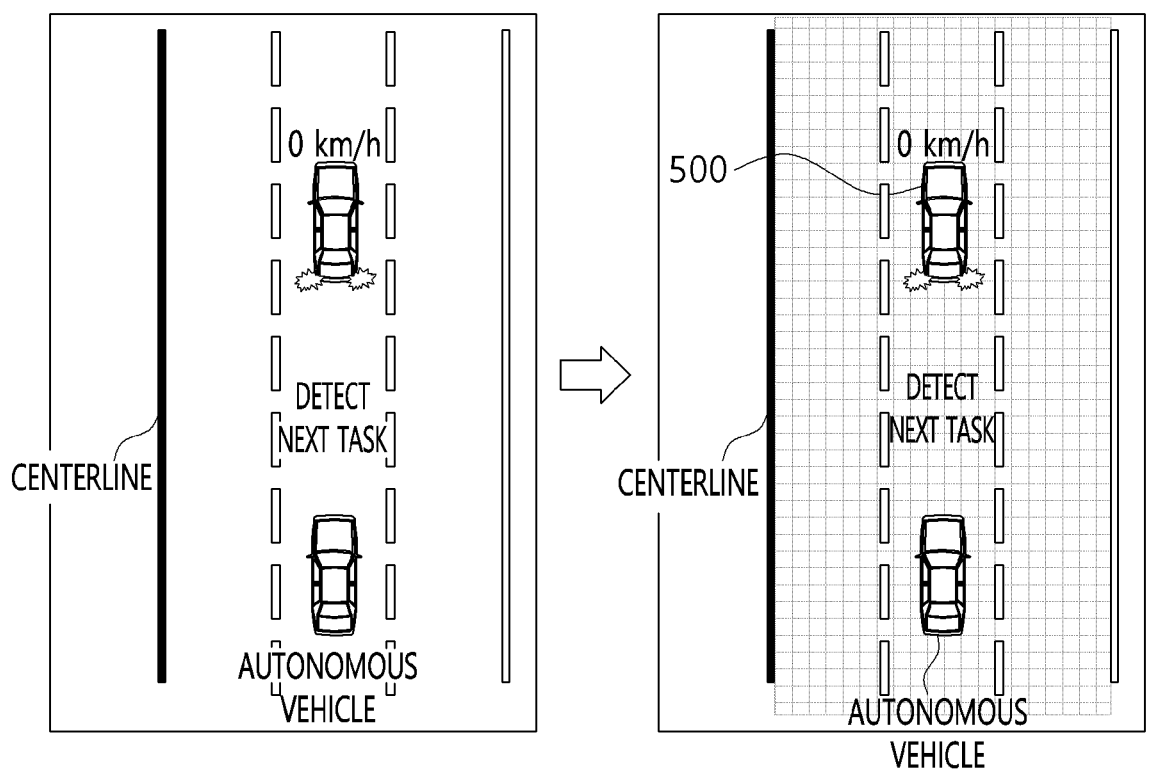

In a further example, as in CASE #3 illustrated in FIG. 5, it may be assumed that a stopped vehicle 500 is located in a lane other than the first lane or the curb lane of a one-way three or more-lane road and that the taillight recognition information for the stopped vehicle 500 corresponds to {taillight OFF} or {emergency-light flashing}. In this case, because the autonomous vehicle may avoid the stopped vehicle 500 by moving to the left or to the right of the stopped vehicle 500, the direction of avoidance may be determined in consideration of the autonomous driving task to be performed by the autonomous vehicle. For example, when the autonomous driving task after avoidance is 'turning right at an intersection' or 'arriving at the destination', the autonomous driving control apparatus may control the autonomous vehicle to perform avoidance by moving to the right of the stopped vehicle 500, whereas when the autonomous driving task after avoidance is 'turning left' or 'making a U-turn', the autonomous driving control apparatus may control the autonomous vehicle to perform avoidance by moving to the left of the stopped vehicle 500.

Figure 6:
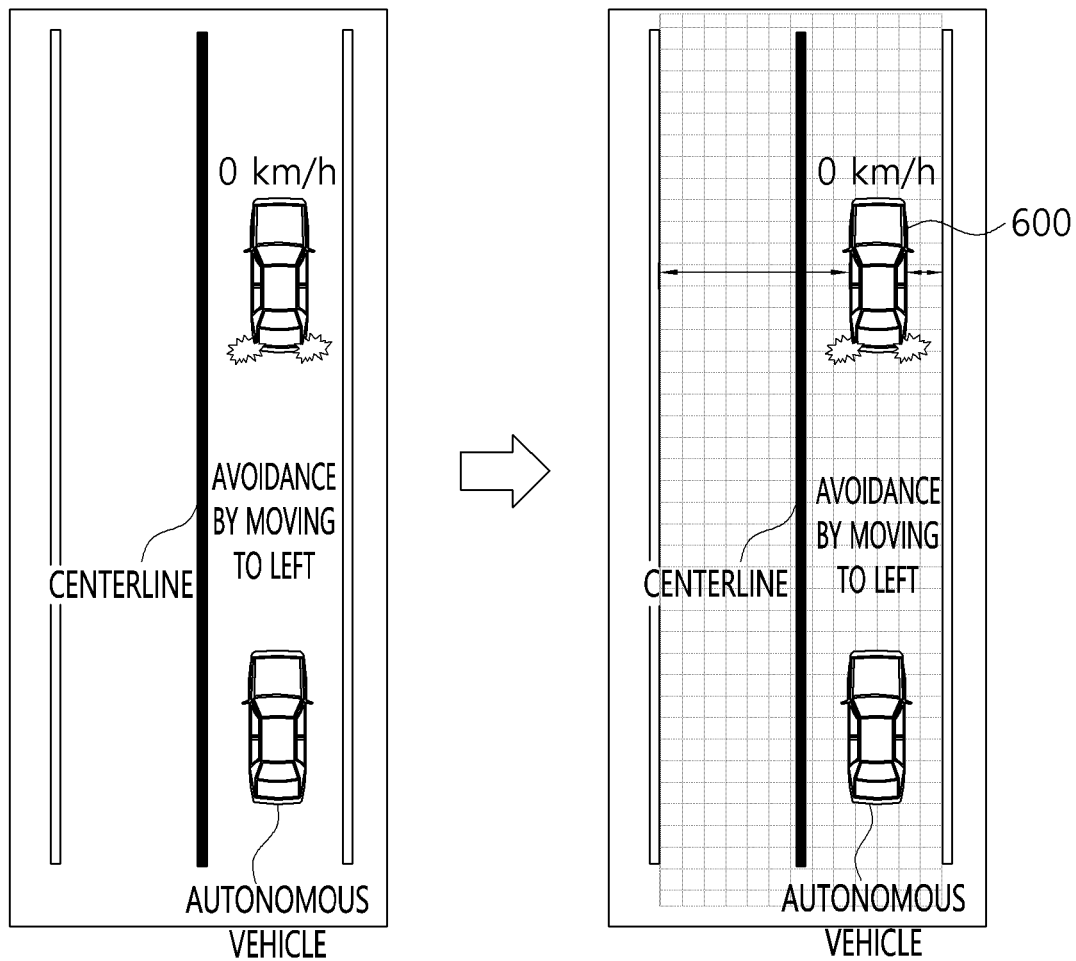

In yet another example, as in CASE #4 illustrated in FIG. 6, it may be assumed that a stopped vehicle 600 is located in the lane of a one-way one-lane road and that the taillight recognition information for the stopped vehicle 600 corresponds to {taillight OFF}, {emergency-light flashing} or {right turn-signal flashing}. In this case, the autonomous driving control apparatus may determine that the stopped vehicle 600 is attempting to park or temporarily stopped, and may control the autonomous vehicle to avoid the stopped vehicle 600 by moving to the left of the stopped vehicle 600 so that the autonomous vehicle does not continue to wait behind the stopped vehicle 600.

Furthermore, in the autonomous driving method for avoiding a stopped vehicle according to the embodiment of the present invention, the autonomous driving control apparatus provided in the autonomous vehicle determines whether avoidance of the stopped vehicle is required at step S125, and sets an avoidance method in consideration of whether lane returning is to be performed, which is determined based on the autonomous driving task when it is determined that avoidance is required at step S130.

Here, the avoidance method may be any one of a first avoidance method for returning to the original lane after avoiding the stopped vehicle, and a second avoidance method for performing lane changing while avoiding the stopped vehicle.

Figure 2:
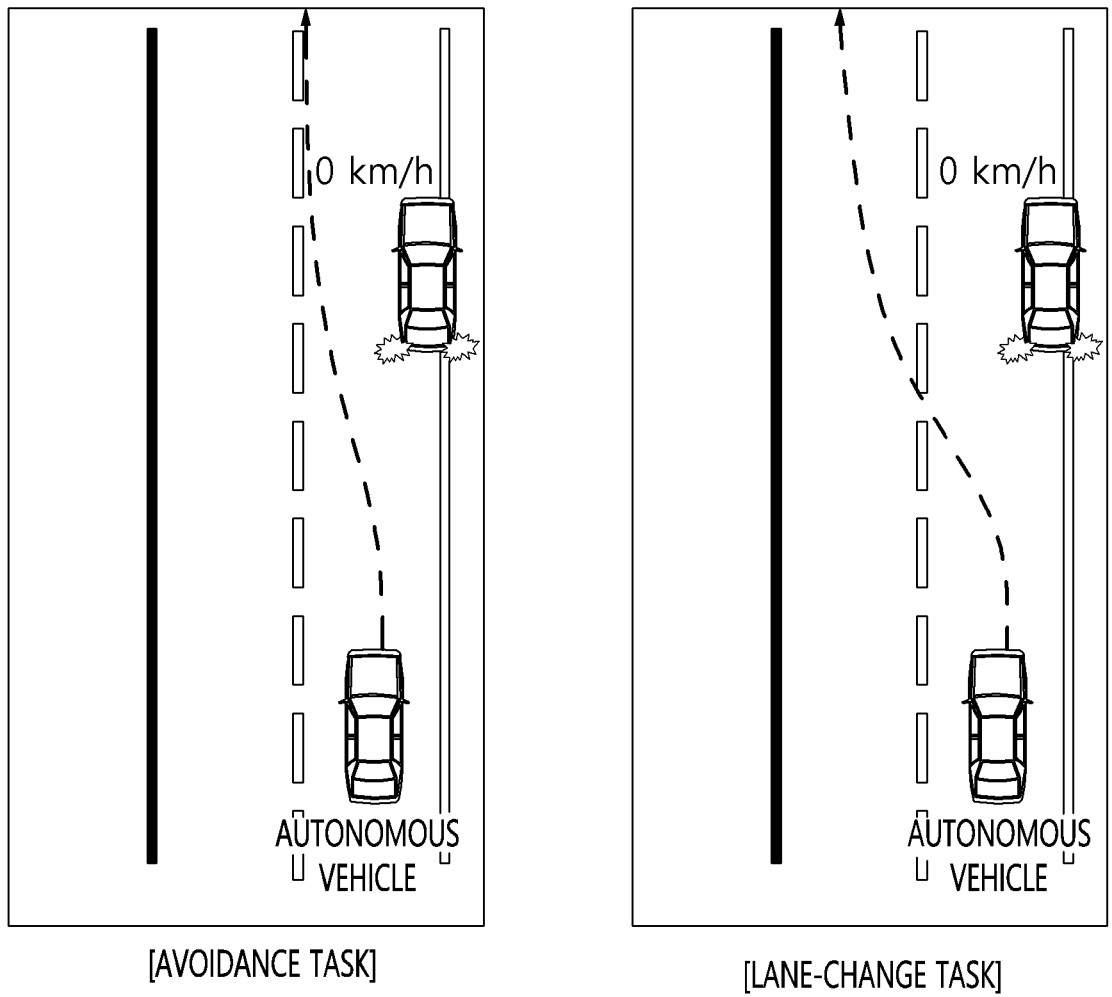
FIG. 2 is a diagram illustrating examples of an avoidance task depending on an avoidance local path and a lane-change task depending on a lane-change local path according to an embodiment of the present invention.

That is, depending on whether the autonomous vehicle is determined to return to the original lane after avoidance, whether the first avoidance method corresponding to the avoidance task illustrated in FIG. 2 is to be performed or whether the second avoidance method corresponding to a lane-change task is to be performed may be determined.

Here, the case may be considered in which, after avoidance of the stopped vehicle, the autonomous driving task (next task) is performed within a preset threshold distance (e.g., 1 km) and corresponds to 'turning right at an intersection', 'turning left', 'making a U-turn', or 'arriving at the destination'.

In an example, when, in the situation of FIG. 3, the next task is performed within a preset threshold distance and is 'turning left at an intersection' or 'making a U-turn', the autonomous vehicle may perform a lane-change task corresponding to the second avoidance method so that the autonomous vehicle avoids the stopped vehicle 300 by moving to the left, and does not return to the original lane.

In another example, when, in the situation of FIG. 4, the next task is performed within a preset threshold distance and is 'turning right at an intersection' or 'arriving at the destination', the autonomous vehicle may perform a lane-change task corresponding to the second avoidance method so that the autonomous vehicle avoids the stopped vehicle 400 by moving to the right, and does not return to the original lane.

In a further example, when, in the situation of FIG. 5, the next task is performed within a preset threshold distance and is 'turning left at an intersection' or 'making a U-turn', the autonomous vehicle may perform a lane-change task corresponding to the second avoidance method so that the autonomous vehicle avoids the stopped vehicle 500 by moving to the left, and does not return to the original lane. Furthermore, when the next task is 'turning right at an intersection' or 'arriving at the destination', the autonomous vehicle may perform a lane-change task corresponding to the second avoidance method so that the autonomous vehicle avoids the stopped vehicle 500 by moving to the right, and does not return to the original lane.

In yet another example, because the situation of FIG. 6 corresponds to a one-way one-lane road, the autonomous vehicle may perform an avoidance task corresponding to the first avoidance method so that the autonomous vehicle avoids the stopped vehicle 600 and unconditionally returns to the original lane regardless of the next task.

Hereinafter, the respective situations in which it is and is not required to return to the original lane, after avoidance of a stopped vehicle will be described in detail with reference to FIGS. 7 and 8.

Figure 7:
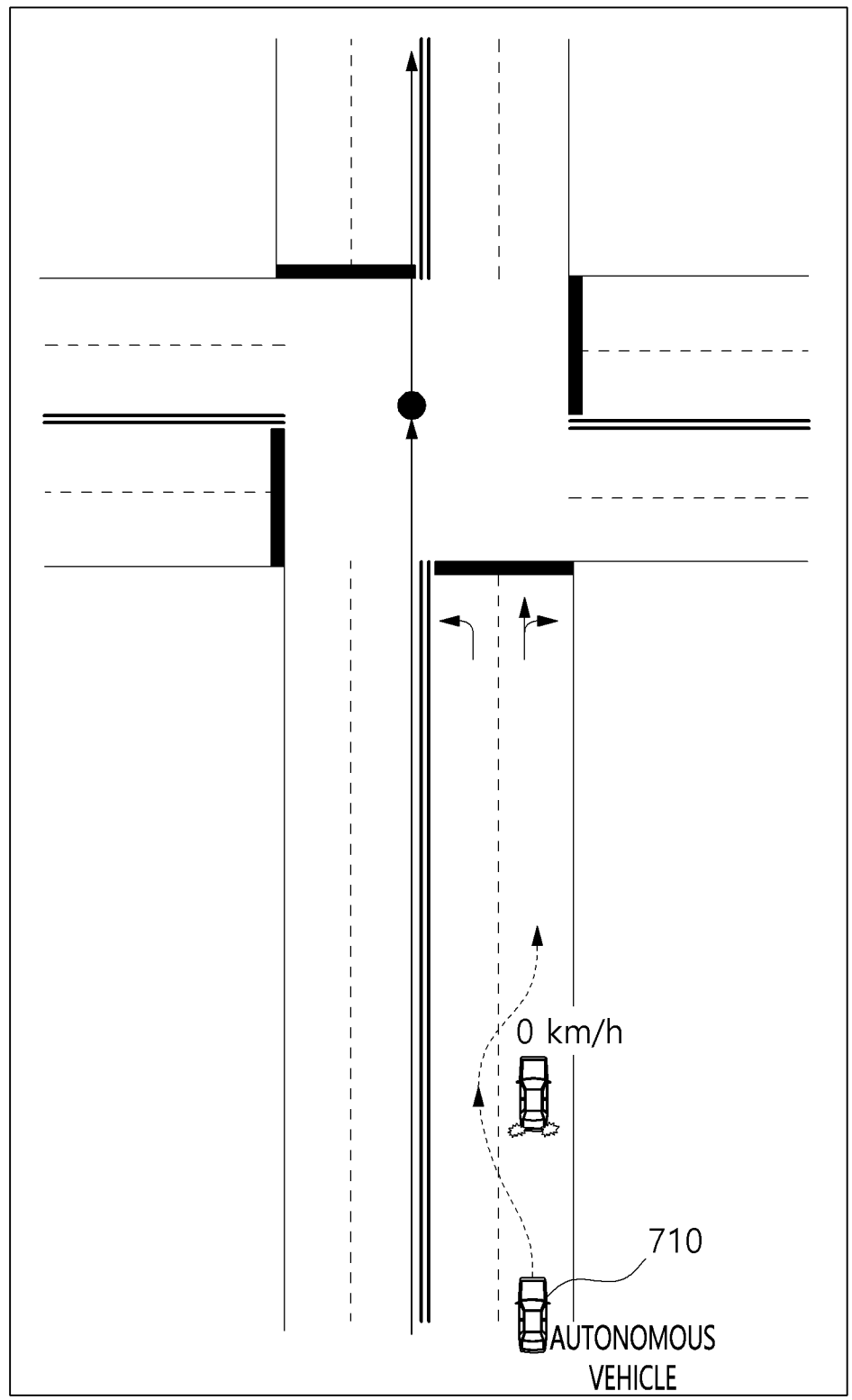
FIGS. 7 and 8 are diagrams illustrating examples of a first avoidance method and a second avoidance method according to the present invention.

First, referring to FIG. 7, it can be seen that, after an autonomous vehicle 710 avoids a stopped vehicle, an autonomous driving task 700 is 'going straight at an intersection'. In this case, because the lane to which the autonomous vehicle moved in order to avoid the stopped vehicle is not a lane for traveling straight, the autonomous vehicle may return to the original lane after avoiding the stopped vehicle based on a first avoidance method.

Figure 8:
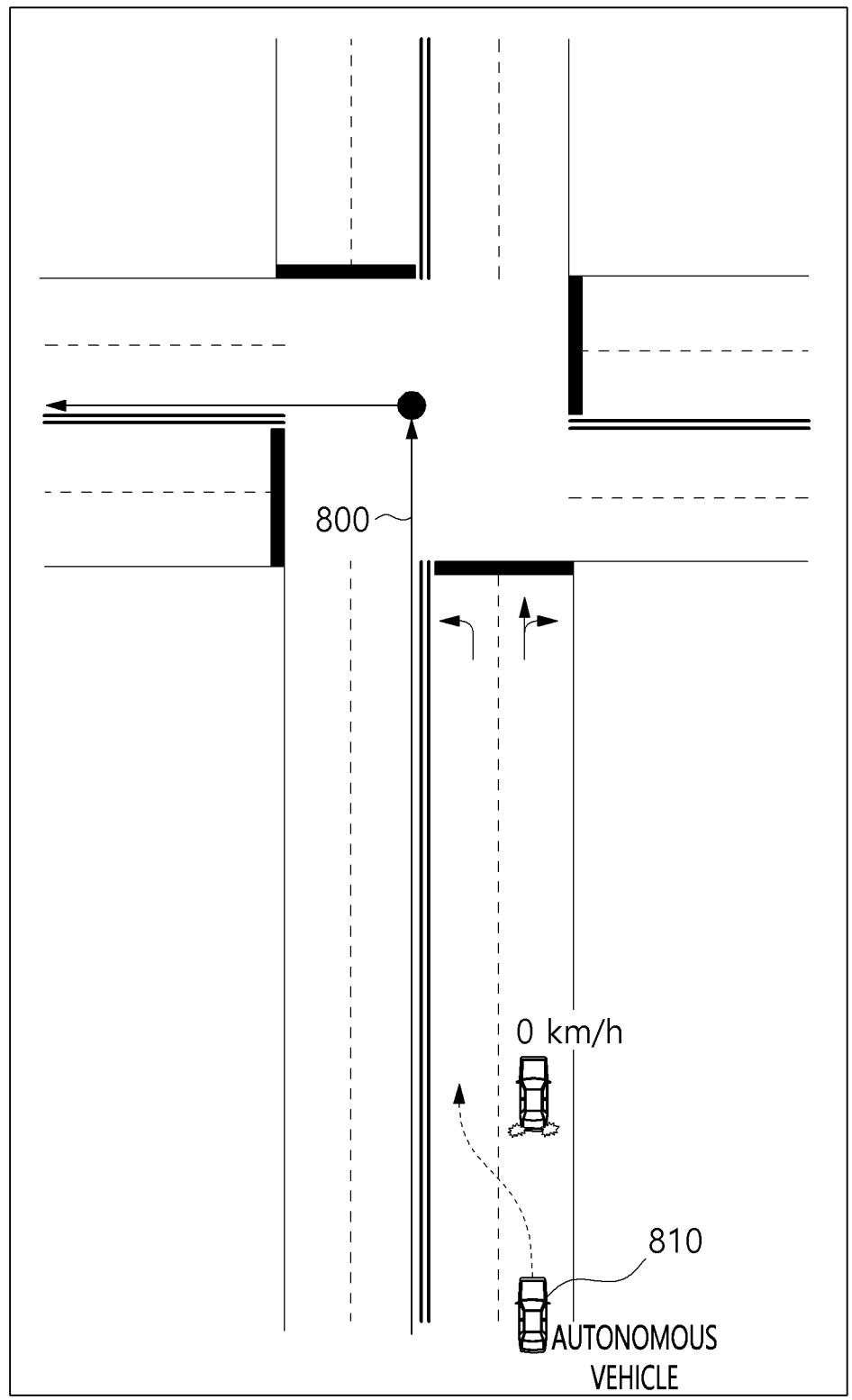

Referring to FIG. 8, it can be seen that, after an autonomous vehicle 810 avoids a stopped vehicle, an autonomous driving task 800 is 'turning left at an intersection'. In this case, because the lane to which the autonomous vehicle moved in order to avoid the stopped vehicle is a lane for making a left turn, the autonomous vehicle may not return to the original lane after avoiding the stopped vehicle based on a second avoidance method.

Here, the operation of going through the intersection, such as that illustrated in FIG. 7 or 8, may be performed at each intersection present along the overall path to the destination in the results of searching for a global path for the autonomous vehicle.

Next, in the autonomous driving method for avoiding a stopped vehicle according to the embodiment of the present invention, the autonomous driving control apparatus provided in the autonomous vehicle sets an avoidance time point based on the avoidance method, and avoids the stopped vehicle by traveling along an avoidance path generated in conformity with the avoidance time point at step S140.

Here, the first avoidance method may avoid the stopped vehicle by generating an avoidance local path at the avoidance time point, determined in consideration of the time to brake to avoid a collision with the stopped vehicle.

Figure 9:
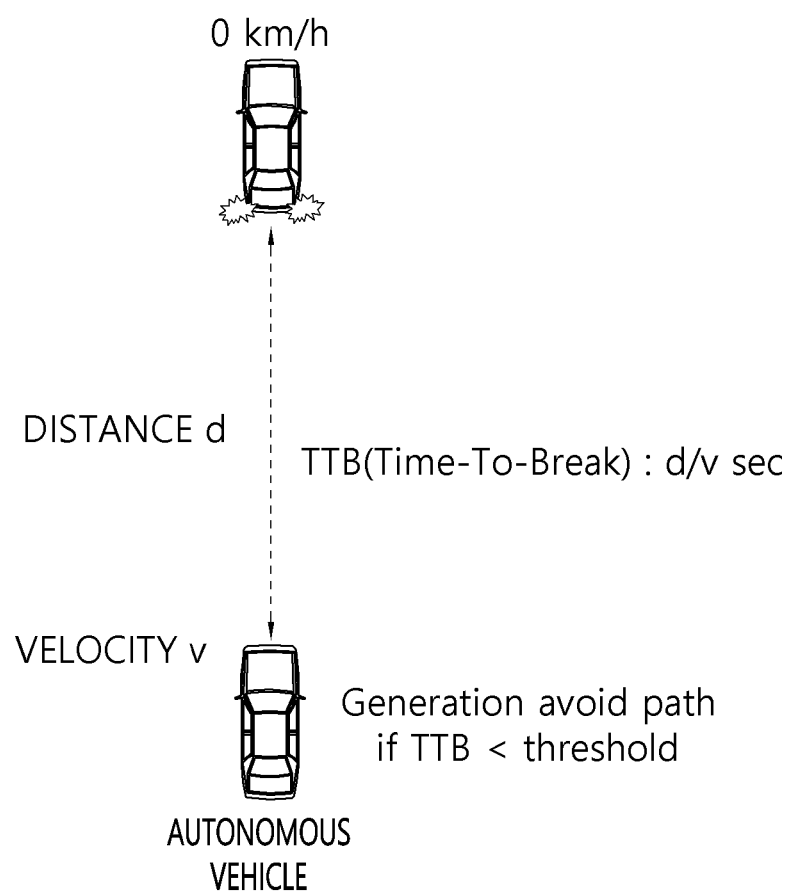
FIG. 9 is a diagram illustrating an example in which an avoidance time point is determined in consideration of the time-to-brake (TTB) to avoid a collision with a stopped vehicle according to the present invention.

For example, as illustrated in FIG. 9, the avoidance time point corresponding to the time point at which the avoidance local path is generated may be determined to be the time point before a threshold time, which is preset in consideration of Time-to-Brake (TTB) to avoid a collision between the autonomous vehicle and the stopped vehicle. Assuming that the preset threshold is 5 seconds, a time point corresponding to more than five seconds before a collision between the autonomous vehicle and the stopped vehicle may be determined to be the avoidance time point, and the avoidance local path may then be generated. Here, the Time-to-Brake (TTB) may be calculated using the velocity (v) of the autonomous vehicle and the distance (d) to the stopped vehicle.

Here, the second avoidance method may perform avoidance of the stopped vehicle by generating a lane-change local path at a lane-change time point.

That is, unlike the avoidance time point, the lane-change time point may be the time point at which to change lane, without considering the Time-to-Brake (TTB) to avoid a collision with the stopped vehicle or the like.

Here, the avoidance local path and the lane-change local path may be generated in consideration of an available avoidance space and an avoidance direction, which are measured using a high-precision lane-level map or a drivable space.

In an example, when the high-precision lane level map is used, an avoidance space present to the left or right of the stopped vehicle 300, 400, 500, or 600 is detected, as illustrated in FIGS. 3 to 6, based on map data in the high-precision lane level map for autonomous driving, and thus an avoidance direction may be determined and an avoidance path (i.e., an avoidance local path or a lane-change local path) corresponding to the determined avoidance direction may be generated.

In another example, the drivable space may be extracted through real-time inference based on artificial-intelligence learning using semantic segmentation. Based on this, as illustrated in FIGS. 3 to 6, a centerline-to-curb drivable space or a curb-to-curb drivable space may be recognized, and the stopped vehicle 300, 400, 500, or 600 may be mapped to the drivable space, whereby a space within which the stopped vehicle 300, 400, 500, or 600 can be avoided in the corresponding drivable space may be detected. The avoidance space may be detected in this way, and thus the avoidance direction may be determined so that the autonomous vehicle is capable of avoiding the stopped vehicle by moving toward the larger available space. That is, in the case of FIG. 5, avoidance may be performed depending on the avoidance direction, which is determined in consideration of the autonomous driving task (next task) after avoidance, and an avoidance path may be generated using the result of recognizing a drivable space at the time point requiring avoidance.

In this case, when the avoidance method is set to a first avoidance method, a virtual autonomous vehicle having the same size as the autonomous vehicle is deployed in the available avoidance space, a virtual lane central line may be generated based on the central line of the virtual autonomous vehicle, and an avoidance local path for moving from the lane central line corresponding to the original lane to the virtual lane central line may be generated.

Figure 10:
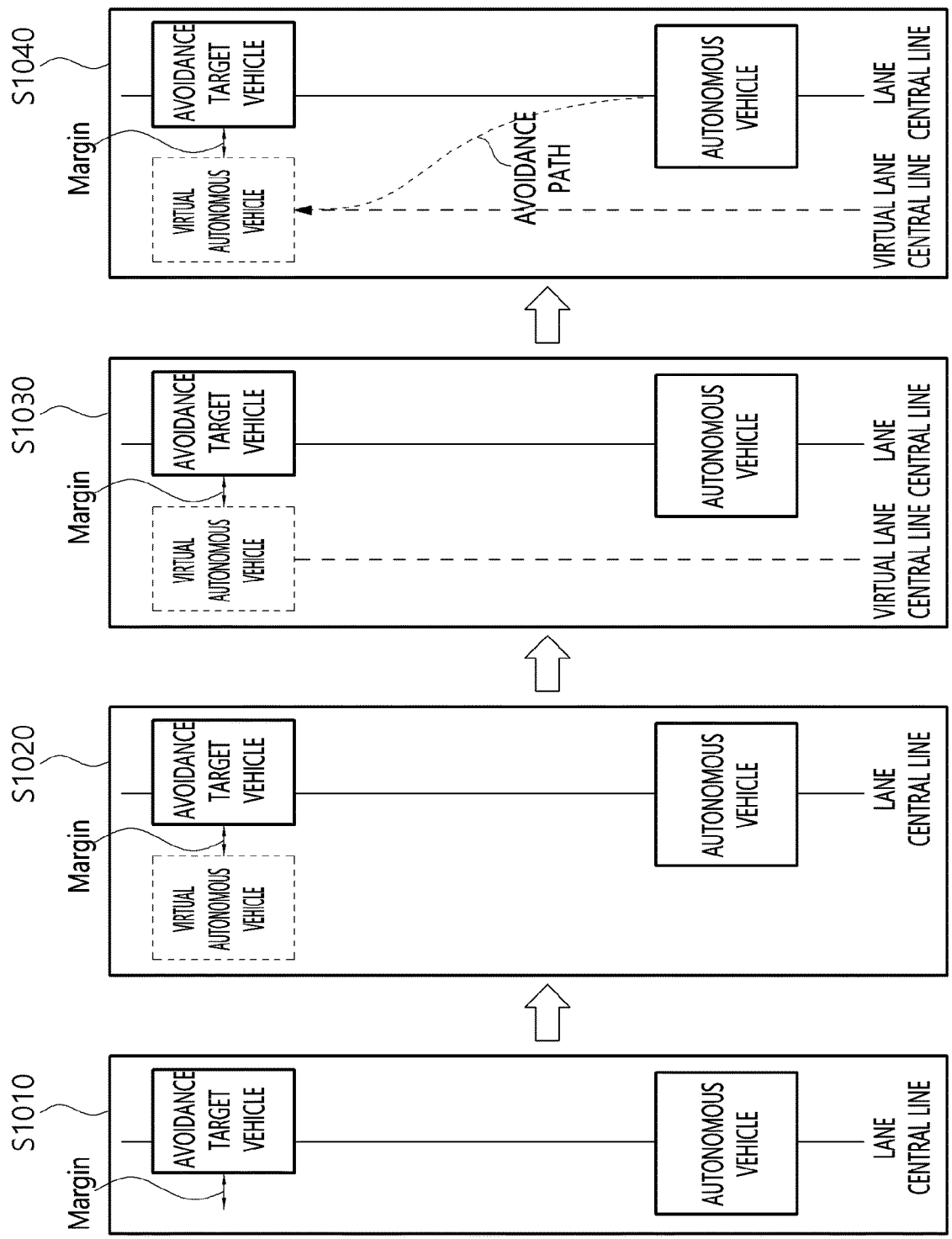
FIG. 10 is a diagram illustrating an example in which an avoidance local path is generated according to the present invention.

Hereinafter, a process of generating an avoidance local path is separated into four steps, and will be described in detail with reference to FIG. 10.

First, a marginal distance (MARGIN) may be set between an avoidance target vehicle (=stopped vehicle) and a virtual autonomous vehicle to be deployed in an available avoidance space so as to maintain avoidance stability at step S1010.

Here, the marginal distance may be set sufficiently large to prevent a collision even if the autonomous vehicle is located alongside the stopped vehicle in consideration of the size of the stopped vehicle and the size of the autonomous vehicle.

Next, the virtual autonomous vehicle may be deployed at an interval of the set marginal distance at step S1020, and a virtual lane central line may be generated based on the central line of the virtual autonomous vehicle at step S1030.

Thereafter, an avoidance local path for moving from the lane central line corresponding to the original lane to the virtual lane central line may be generated at step S1040.

Here, the avoidance local path may be generated as a traceable path using the kinematics model of the autonomous vehicle.

Here, when the avoidance method is set to a first avoidance method, a return local path for moving from the virtual lane central line to the lane central line corresponding to the original lane after completion of avoidance of the stopped vehicle may be generated, and lane returning may be performed along the return local path.

The process of generating the return local path may be identical to the process of generating the avoidance local path.

Here, when the autonomous vehicle is located in the lane central line corresponding to the original lane, the avoidance task corresponding to the first avoidance method may be completed.

Here, when the avoidance method is set to a second avoidance method, a lane-change local path for moving from the lane central line corresponding to the original lane to a lane central line corresponding to the target lane in which to travel may be generated.

Here, a risk of collision with another vehicle traveling in the lane in the avoidance direction may be calculated, and avoidance may be performed when the collision risk is less than or equal to a preset reference risk.

Figure 11:
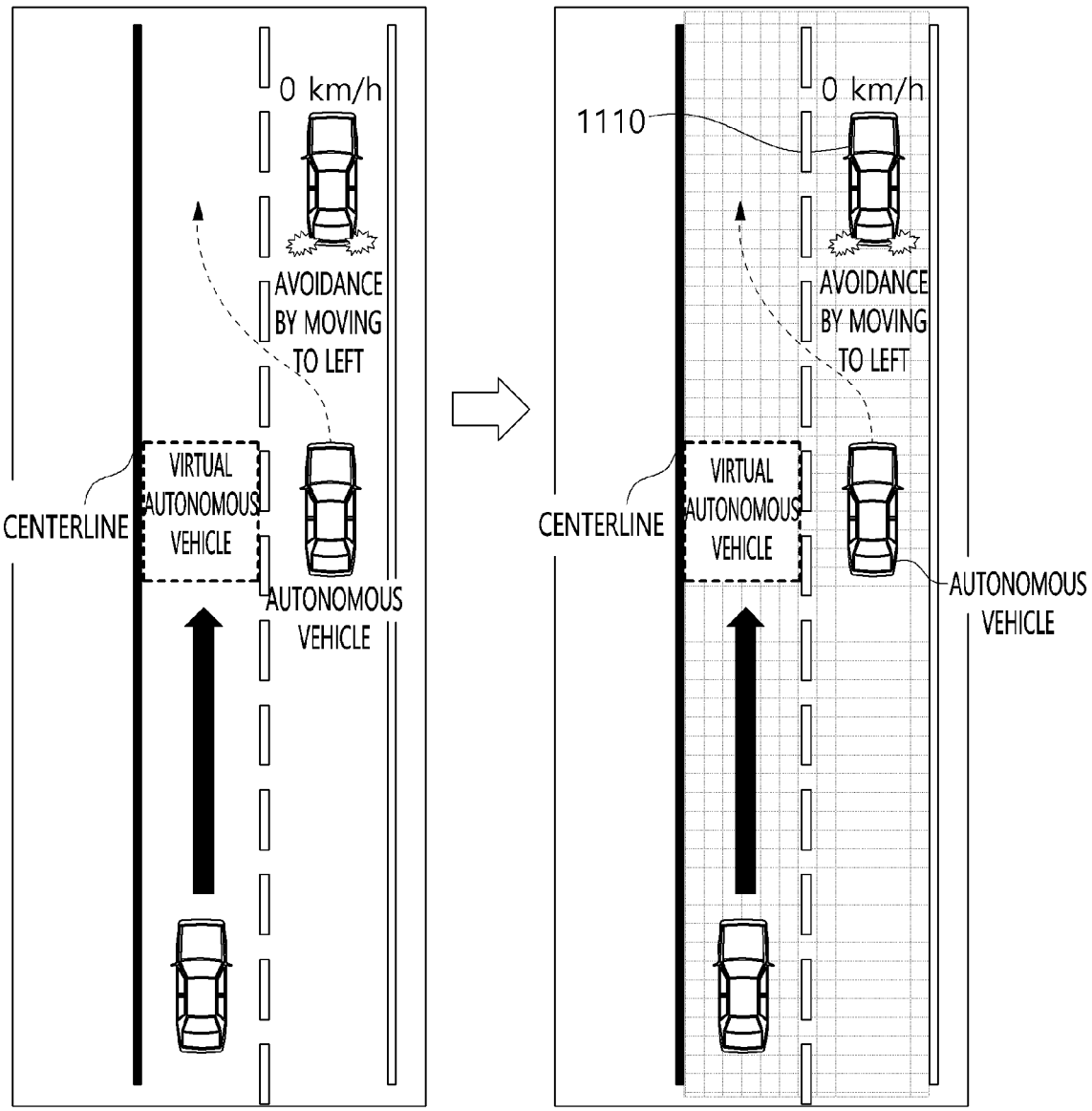
FIGS. 11 and 12 are diagrams illustrating an example in which avoidance is performed by analyzing a collision risk according to the present invention.

For example, referring to FIG. 11, in the case where a left lane is present when an autonomous vehicle avoids a stopped vehicle 1110 by moving to the left, a risk of collision with a side vehicle traveling in the left lane may be calculated. Here, a virtual autonomous vehicle may be deployed in the left lane at the time point at which the autonomous vehicle starts avoidance, and Time-to-Collision (TTC) may be calculated. When the TTC is less than or equal to a threshold, it may be determined that the collision risk is greater than the preset reference risk. In this case, the autonomous vehicle may wait for avoidance by stopping, and avoidance may be resumed when TTC with a rear side vehicle is equal to or greater than the threshold.

Here, the Time-To-Collision (TTC) may be calculated as the 'distance to additional vehicle/(autonomous vehicle velocity—additional vehicle velocity)'.

Figure 12:
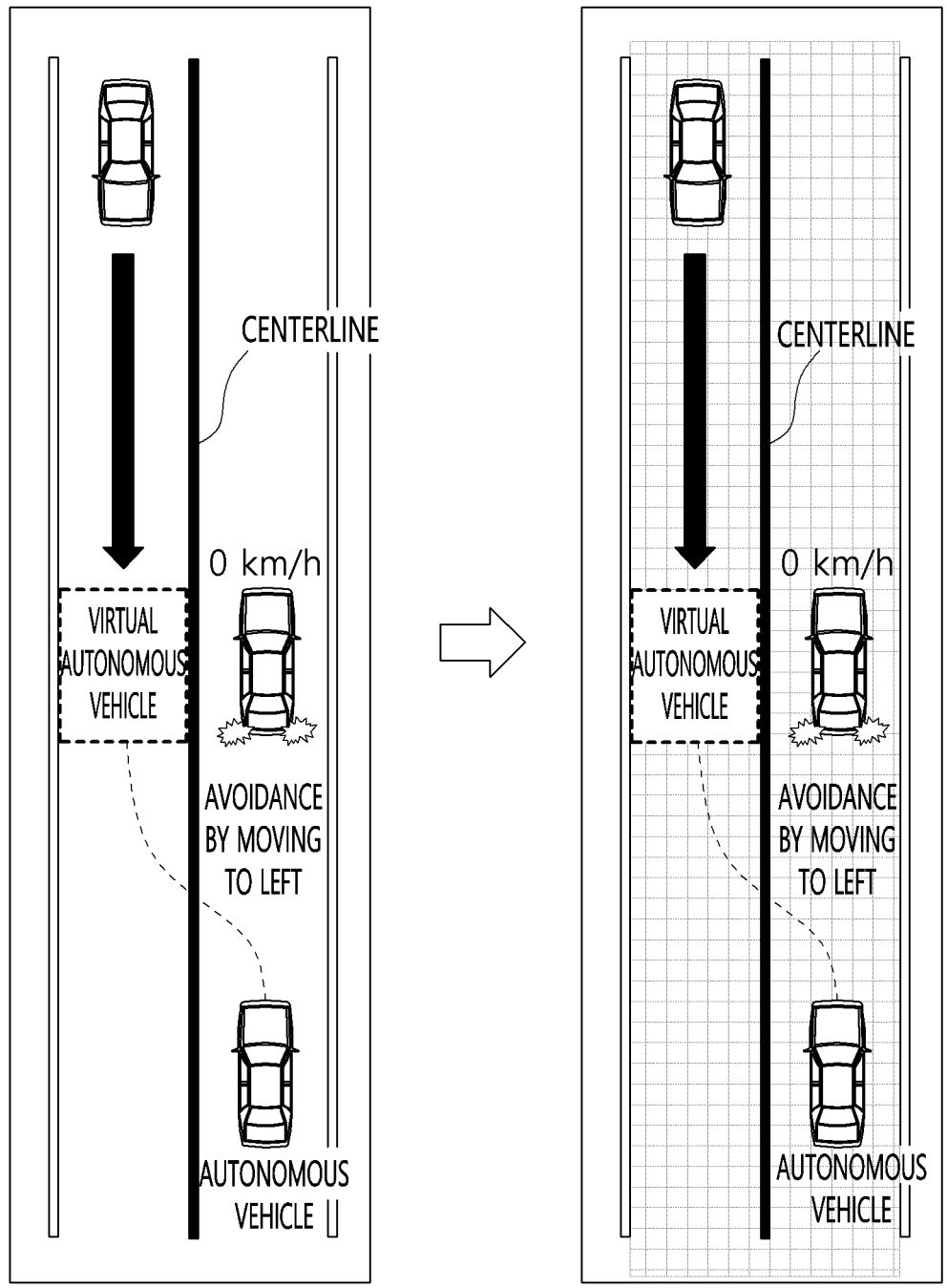

In another example, referring to FIG. 12, when an autonomous vehicle avoids a stopped vehicle by crossing the centerline, a risk of collision with an oncoming vehicle that is traveling in the lane on the other side of the centerline may be calculated. Here, similar to FIG. 11, a virtual autonomous vehicle may be deployed in the lane on the other side of the centerline at the time point at which the autonomous vehicle starts avoidance, and Time-to-Collision (TTC) may be calculated. When the TTC is less than or equal to the threshold, it may be determined that the collision risk is greater than the preset reference risk.

Here, the method for analyzing the collision risk may employ and use various methods, such as a probability calculation method or an artificial intelligence deep learning method, in addition to the method using TTC used in the example.

Furthermore, when it is determined at step S125 that avoidance is not required, the current process is terminated.

In addition, although not illustrated in FIG. 1, the autonomous driving method for avoiding a stopped vehicle according to an embodiment of the present invention may determine that an avoidance task corresponding to the first avoidance method has been completed when the autonomous vehicle is located alongside a stopped vehicle, and may determine that a lane-change task corresponding to a second avoidance method has been completed when the autonomous vehicle is located on the lane central line of the lane to which the autonomous vehicle has moved in order to avoid the stopped vehicle.

By means of the autonomous driving method for avoiding a stopped vehicle, a path for avoiding a stopped vehicle present in a driving lane for an autonomous vehicle may be generated and provided, thus allowing the autonomous vehicle to travel in an autonomous driving mode without changing the driving mode from the autonomous driving mode to a manual driving mode until arriving at the destination.

Further, by recognizing taillights of a stopped vehicle, the accuracy of determination for avoidance may be improved, and autonomous driving for performing an avoidance task may be performed.

Figure 13:
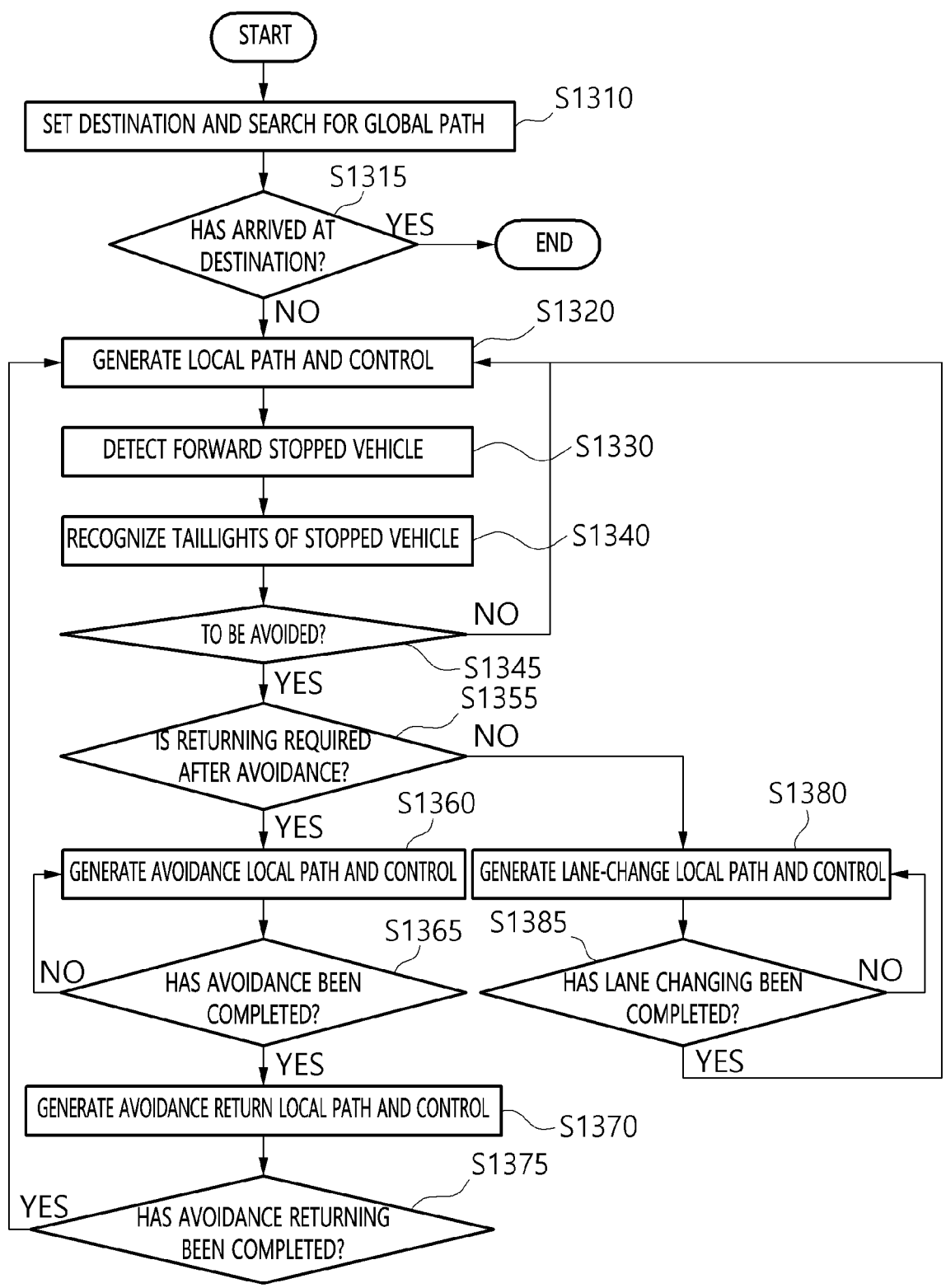
FIG. 13 is an operation flowchart illustrating in detail an autonomous driving method for avoiding a stopped vehicle according to an embodiment of the present invention.

FIG. 13 is an operation flowchart illustrating in detail an autonomous driving method for avoiding a stopped vehicle according to an embodiment of the present invention.

Referring to FIG. 13, in the autonomous driving method for avoiding a stopped vehicle according to the embodiment of the present invention, an autonomous driving control apparatus may first start autonomous driving by searching for a global path to a destination of the autonomous vehicle when the destination is set at step S1310.

Thereafter, the autonomous vehicle may perform autonomous driving for avoiding a stopped vehicle while continuing to determine whether the autonomous vehicle has arrived at the destination at step S1315.

When it is determined at step S1315 that the autonomous vehicle has arrived at the destination, autonomous driving for avoiding a stopped vehicle may be completed.

When it is determined at step S1315 that the autonomous vehicle has not arrived at the destination, the autonomous driving control apparatus may control the autonomous vehicle by generating a local path depending on the autonomous driving task for moving to the destination at step S1320.

Thereafter, among forward obstacles (e.g., a vehicle, a pedestrian, or the like) detected using a camera sensor, a lidar sensor, a radar sensor, or the like provided on the autonomous vehicle, a stopped vehicle moving at a velocity of '0' may be detected at step S1330.

Thereafter, taillight recognition information may be generated by recognizing taillights of the stopped vehicle at step S1340, and whether the stopped vehicle is to be avoided may be determined based on the taillight recognition information at step S1345.

For example, when the taillights of the stopped vehicle are in a state such as {taillight OFF} or {emergency-light flashing}, or a state such as {right-turn-signal flashing} in the curb lane, it may be determined that the stopped vehicle is to be avoided.

When it is determined at step S1345 that the stopped vehicle is not to be avoided, the autonomous driving control apparatus may control the autonomous vehicle by generating a local path corresponding to the autonomous driving task at step S1320.

Further, when it is determined at step S1345 that the autonomous vehicle is controlled to avoid the stopped vehicle, whether returning to the original lane is required after avoidance of the stopped vehicle may be determined at step S1355.

When it is determined at step S1355 that returning to the original lane after avoidance is required, the autonomous driving control apparatus may control the autonomous vehicle to avoid the stopped vehicle by generating an avoidance local path at an avoidance time point, which is determined based on a first avoidance method, at step S1360.

Here, the avoidance time point may be determined in consideration of Time-to-Brake (TTB), which is calculated using the current location and velocity of the autonomous vehicle, the distance to the stopped vehicle, etc. Further, the avoidance local path may be generated by setting the size of the stopped vehicle and a margin for avoiding the stopped vehicle.

Next, whether avoidance has been completed may be determined at step S1365, and step S1360 may be repeatedly performed until avoidance of the stopped vehicle is completed when it is determined that avoidance has not been completed.

On the other hand, when it is determined at step S1354 that avoidance has been completed, the autonomous vehicle control apparatus may control the autonomous vehicle so that the autonomous vehicle returns to the original lane by generating an avoidance return local path at step S1370.

Here, when the autonomous vehicle is located alongside the stopped vehicle, or passes the stopped vehicle, it may be determined that avoidance has been completed.

Thereafter, whether avoidance returning has been completed is determined at step S1375. When avoidance returning has not been completed, step S1370 may be repeatedly performed until avoidance returning is completed.

Here, when the autonomous vehicle is located on the lane central line of the original lane, it may be determined that avoidance returning has been completed.

Further, when it is determined at step S1355 that returning to the original lane after avoidance is not required, the autonomous driving control apparatus may control the autonomous vehicle to avoid the stopped vehicle by generating a lane-change local path at a lane-change time point, which is determined based on a second avoidance method, at step S1380.

Thereafter, whether lane changing has been completed may be determined at step S1385, and step S1380 may be repeatedly performed until lane changing is completed when it is determined that lane changing has not been completed.

Here, when the autonomous vehicle is located on the lane central line of the changed lane, it may be determined that lane changing has been completed.

Figure 14:
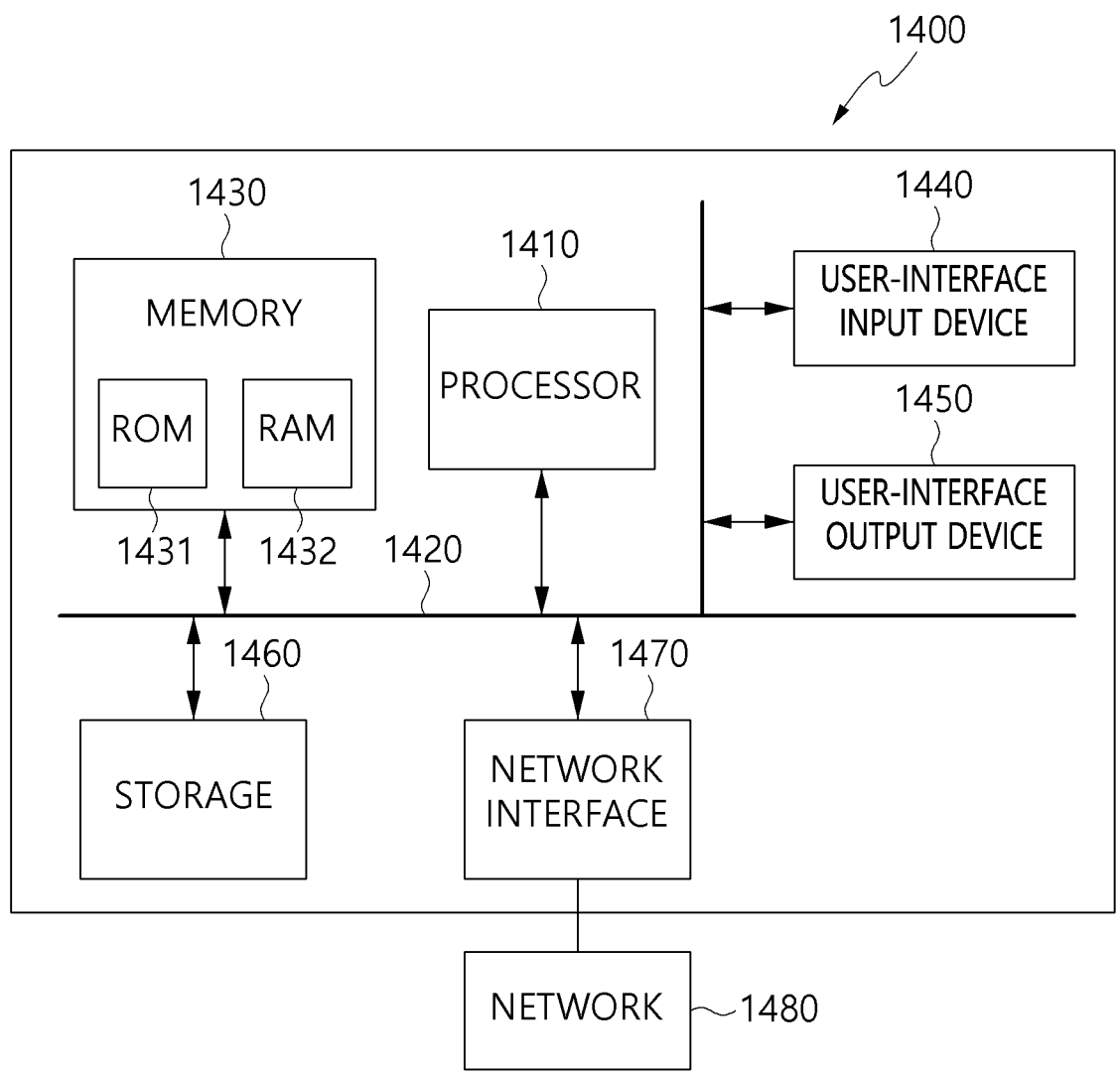
FIG. 14 is a block diagram of an autonomous driving control apparatus for autonomous driving to avoid a stopped vehicle according to an embodiment of the present invention.

FIG. 14 is a block diagram of an autonomous driving control apparatus for autonomous driving to avoid a stopped vehicle according to an embodiment of the present invention.

Referring to FIG. 14, an autonomous driving control apparatus for autonomous driving to avoid a stopped vehicle according to an embodiment of the present invention may be implemented in a computer system such as a computer-readable storage medium. As illustrated in FIG. 14, a computer system 1400 may include one or more processors 1410, memory 1430, a user interface input device 1440, a user interface output device 1450, and storage 1460, which communicate with each other through a bus 1420. The computer system 1400 may further include a network interface 1470 connected to a network 1480. Each processor 1410 may be a Central Processing Unit (CPU) or a semiconductor device for executing processing instructions stored in the memory 1430 or the storage 1460. Each of the memory 1430 and the storage 1460 may be any of various types of volatile or nonvolatile storage media. For example, the memory 1430 may include Read-Only Memory (ROM) 1431 or Random Access Memory (RAM) 1432.

Accordingly, an embodiment of the present invention may be implemented as a non-transitory computer-readable storage medium in which methods implemented using a computer or instructions executable in a computer are recorded. When the computer-readable instructions are executed by the processor, the computer-readable instructions may perform a method according to at least one aspect of the present invention.

The processor 1410 obtains taillight recognition information for a stopped vehicle identified ahead of the autonomous vehicle.

Here, the taillight recognition information may include emergency-light flashing information, taillight on/off information, turn-signal flashing information, and brake light on/off information.

Here, the stopped vehicle may be identified based on obstacle information that is detected based on at least one of a camera sensor, a lidar sensor or a radar sensor, or combination thereof.

Here, a partial image corresponding to the taillight portion of the stopped vehicle may be extracted by projecting the obstacle information onto an image, and taillight recognition information may be generated based on successive data of image scenes corresponding to the partial image.

Further, the processor 1410 determines whether a stopped vehicle is to be avoided in consideration of the taillight recognition information.

When it is determined that the stopped vehicle is to be avoided, the processor 1410 sets an avoidance method in consideration of whether lane returning is to be performed, which is determined based on the autonomous driving task when it is determined that avoidance is required.

Here, the avoidance method may be any one of a first avoidance method for returning to the original lane after avoiding the stopped vehicle, and a second avoidance method for performing lane changing while avoiding the stopped vehicle.

Furthermore, the processor 1410 may set an avoidance time point corresponding to the avoidance method, and may avoid the stopped vehicle by traveling along the avoidance path generated in conformity with the avoidance time point.

The first avoidance method may avoid the stopped vehicle by generating an avoidance local path at the avoidance time point, determined in consideration of the time to brake to avoid a collision with the stopped vehicle.

The second avoidance method may perform avoidance of the stopped vehicle by generating a lane-change local path at a lane-change time point.

Here, the avoidance local path and the lane-change local path may be generated in consideration of an available avoidance space and an avoidance direction, which are measured using a high-precision lane-level map or a drivable space.

In this case, when the avoidance method is set to the first avoidance method, a virtual autonomous vehicle having the same size as the autonomous vehicle is deployed in the available avoidance space, a virtual lane central line may be generated based on the central line of the virtual autonomous vehicle, and an avoidance local path for moving from the lane central line corresponding to the original lane to the virtual lane central line may be generated.

Here, when the avoidance method is set to the second avoidance method, a lane-change local path for moving from the lane central line corresponding to the original lane to a lane central line corresponding to the target lane in which to travel may be generated.

Here, when the avoidance method is set to the first avoidance method, a return local path for moving from the virtual lane central line to the lane central line corresponding to the original lane after completion of avoidance of the stopped vehicle may be generated, and lane returning may be performed along the return local path.

Here, a risk of collision with another vehicle traveling in the lane in the avoidance direction may be calculated, and avoidance may be performed when the collision risk is less than or equal to a preset reference risk.

Because the process for performing autonomous driving to avoid a stopped vehicle by the processor 1410 is identical to that of FIG. 1, a description thereof will be omitted.

The memory 1430 stores the taillight recognition information, the avoidance time point, and the avoidance path.

Further, as described above, the memory 1430 stores various types of information generated by the autonomous driving control apparatus according to the embodiment of the present invention, as described above.

In accordance with an embodiment, the memory 1430 may be configured independently of the autonomous driving control apparatus, thus supporting functions for autonomous driving to avoid a stopped vehicle. Here, the memory 1430 may function as separate mass storage, and may include a control function for performing related operations.

Meanwhile, the autonomous driving control apparatus may include memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, a storage device is a computer-readable recording medium. In different embodiments, the storage device may include, for example, a hard-disk device, an optical disk device, or any other kind of mass storage device.

By utilizing the autonomous driving control apparatus, a path for avoiding a stopped vehicle present in a driving lane for an autonomous vehicle may be generated and provided, thus allowing the autonomous vehicle to travel in an autonomous driving mode without changing the driving mode to a manual driving mode until arriving at the destination.

Further, by recognizing a taillight of a stopped vehicle, the accuracy of determination for avoidance may be improved, and autonomous driving of performing an avoidance task may be performed.

In accordance with the present invention, there can be provided a method for performing autonomous driving to a destination, without changing the driving mode from an autonomous driving mode to a manual driving mode, by generating and providing a path for avoiding a stopped vehicle present in the driving lane of an autonomous vehicle.

Further, in accordance with the present invention, there can be provided an autonomous driving method that improves the accuracy of determination for avoidance by recognizing taillights of a stopped vehicle, and performs an avoidance task.

As described above, in the autonomous driving method for avoiding a stopped vehicle and the apparatus for the autonomous driving method according to the present invention, the configurations and schemes in the above-described embodiments are not limitedly applied, and some or all of the above embodiments can be selectively combined and configured such that various modifications are possible.

What is claimed is:

1. An autonomous driving method for avoiding a stopped vehicle, the autonomous driving method being performed by an autonomous driving control apparatus provided in an autonomous vehicle, the autonomous driving method comprising:
   obtaining taillight recognition information for a stopped vehicle identified ahead of the autonomous vehicle;
   determining whether the stopped vehicle is to be avoided in consideration of the taillight recognition information;
   when it is determined that the stopped vehicle is to be avoided, setting an avoidance method in consideration of whether lane returning is to be performed, which is determined based on an autonomous driving task; and
   setting an avoidance time point corresponding to the avoidance method and controlling the autonomous vehicle to avoid the stopped vehicle by traveling along an avoidance path generated in conformity with the avoidance time point,
   wherein the avoidance method is any one of a first avoidance method for returning to an original lane after avoiding the stopped vehicle and a second avoidance method for performing lane changing while avoiding the stopped vehicle,
   wherein:
   the first avoidance method avoids the stopped vehicle by generating an avoidance local path at an avoidance time point that is set in consideration of a time to brake to avoid a collision with the stopped vehicle, and
   the second avoidance method avoids the stopped vehicle by generating a lane-change local path at a time point for lane changing,
   wherein each of the avoidance local path and the lane-change local path is generated in consideration of an available avoidance space and an avoidance direction that are measured using a high-precision lane level map or a drivable space, and
   further comprising:
   when the avoidance method is set to the first avoidance method, deploying a virtual autonomous vehicle having a size identical to a size of the autonomous vehicle in the avoidance available space, generating a virtual lane central line based on a central line of the virtual autonomous vehicle, and generating the avoidance local path for moving from a lane central line corresponding to the original lane to the virtual lane central line.

2. The autonomous driving method of claim 1, further comprising:
   when the avoidance method is set to the second avoidance method, generating the lane-change local path for moving from a lane central line corresponding to the original lane to a lane central line corresponding to a target lane in which to travel.

3. The autonomous driving method of claim 1, further comprising:
   when the avoidance method is set to the first avoidance method, generating a return local path for moving from the virtual lane central line to a lane central line corresponding to the original lane after avoidance of the stopped vehicle has been completed, and performing returning along the return local path.

4. The autonomous driving method of claim 1, further comprising:
calculating a risk of a collision with an additional vehicle traveling in a lane in the avoidance direction, and performing avoidance when the collision risk is less than or equal to a preset reference risk.

5. The autonomous driving method of claim 1, wherein the taillight recognition information includes emergency-light flashing information, taillight on/off information, turn-signal flashing information, and brake-light on/off information.

6. The autonomous driving method of claim 1, wherein the stopped vehicle is identified based on obstacle information that is detected based on at least one of a camera sensor, a lidar sensor or a radar sensor, or a combination thereof.

7. The autonomous driving method of claim 1, further comprising:
extracting a partial image corresponding to a taillight portion of the stopped vehicle by projecting the obstacle information onto an image; and
generating the taillight recognition information based on successive data of an image scene corresponding to the partial image.

8. An autonomous driving control apparatus comprising:
a processor configured to obtain taillight recognition information for a stopped vehicle identified ahead of an autonomous vehicle, determine whether the stopped vehicle is to be avoided in consideration of the taillight recognition information, when it is determined that the stopped vehicle is to be avoided, set an avoidance method in consideration of whether lane returning is to be performed, which is determined based on an autonomous driving task, set an avoidance time point corresponding to the avoidance method, and control the autonomous vehicle to avoid the stopped vehicle by traveling along an avoidance path generated in conformity with the avoidance time point; and
a memory configured to store the taillight recognition information, the avoidance time point, and the avoidance path,
wherein the avoidance method is any one of a first avoidance method for returning to an original lane after avoiding the stopped vehicle and a second avoidance method for performing lane changing while avoiding the stopped vehicle,
wherein:
the first avoidance method avoids the stopped vehicle by generating an avoidance local path at an avoidance time point that is set in consideration of a time to brake to avoid a collision with the stopped vehicle, and
the second avoidance method avoids the stopped vehicle by generating a lane-change local path at a time point for lane changing,
wherein each of the avoidance local path and the lane-change local path is generated in consideration of an available avoidance space and an avoidance direction that are measured using a high-precision lane level map or a drivable space, and
wherein the processor is configured to, when the avoidance method is set to the first avoidance method, deploy a virtual autonomous vehicle having a size identical to a size of the autonomous vehicle in the avoidance available space, generate a virtual lane central line based on a central line of the virtual autonomous vehicle, and generate the avoidance local path for moving from a lane central line corresponding to the original lane to the virtual lane central line.

9. The autonomous driving control apparatus of claim 8, wherein the processor is configured to, when the avoidance method is set to the second avoidance method, generate the lane-change local path for moving from a lane central line corresponding to the original lane to a lane central line corresponding to a target lane in which to travel.

10. The autonomous driving control apparatus of claim 8, wherein the processor is configured to, when the avoidance method is set to the first avoidance method, generate a return local path for moving from the virtual lane central line to a lane central line corresponding to the original lane after avoidance of the stopped vehicle has been completed, and control the autonomous vehicle to perform returning along the return local path.

11. The autonomous driving control apparatus of claim 8, wherein the processor is configured to calculate a risk of a collision with an additional vehicle traveling in a lane in the avoidance direction, and perform avoidance when the collision risk is less than or equal to a preset reference risk.

12. The autonomous driving control apparatus of claim 8, wherein the taillight recognition information includes emergency-light flashing information, taillight on/off information, turn-signal flashing information, and brake-light on/off information.

* * * * *